United States Patent [19]

Calkins

[11] Patent Number: 4,994,303
[45] Date of Patent: Feb. 19, 1991

[54] FIBER IMPREGNATION PROCESS
[75] Inventor: Richard W. Calkins, Palmyra, N.Y.
[73] Assignee: Garlock, Inc., Palmyra, N.Y.
[21] Appl. No.: 171,116
[22] Filed: Mar. 21, 1988
[51] Int. Cl.[5] .................. B05D 1/18; B05D 3/02; B05D 3/12
[52] U.S. Cl. .................. 427/173; 427/175; 427/401; 427/434.4; 427/434.6; 87/1
[58] Field of Search .......... 427/434.4, 434.6, 173, 427/175, 307, 308, 401, 309; 118/428, DIG. 19, 34; 277/DIG. 6; 87/1

[56] References Cited

U.S. PATENT DOCUMENTS

| | | | |
|---|---|---|---|
| 3,692,727 | 9/1972 | Peschko . | |
| 3,779,844 | 12/1973 | Dorsch | 427/434.4 X |
| 3,968,297 | 7/1976 | Sauer | 428/268 |
| 4,232,087 | 11/1980 | Trask | 428/389 |
| 4,298,562 | 11/1981 | Latty | 277/DIG. 6 X |
| 4,495,017 | 1/1985 | Abe et al. | 427/434.4 X |
| 4,559,862 | 12/1985 | Case et al. | 87/1 |
| 4,643,126 | 2/1987 | Wilkinson et al. | 427/434.4 X |
| 4,689,244 | 8/1987 | Lusk | 427/434.4 X |

Primary Examiner—Evan Lawrence
Attorney, Agent, or Firm—Sixbey, Friedman, Leedom & Ferguson

[57] ABSTRACT

A method of producing a low cost impregnated and coated fiber useful in forming pump, valve, expansion joint, hydraulic cylinder and similar packings capable of resisting high caustic concentrations is provided. In accordance with this method a relatively low cost yarn, such as rayon, is simultaneously subjected to a spreading operation and passed through a highly alkaline colloidal tetrafluoroethylene (TFE) solution. As the yarn fibers are spread from a fiber bundle to a flat ribbon-like array of spaced parallel fibers, the fibers swell or "balloon," thus allowing the TFE to completely penetrate the interior of each fiber. A subsequent coating step insures that the exterior of each fiber is completely coated with the TFE solution. Fibers produced according to the present process are characterized by substantially lower cost than available materials, are completely caustic resistant at a pH approaching or exceeding 14, and have a long, useful service life in a variety of different environments.

14 Claims, 1 Drawing Sheet

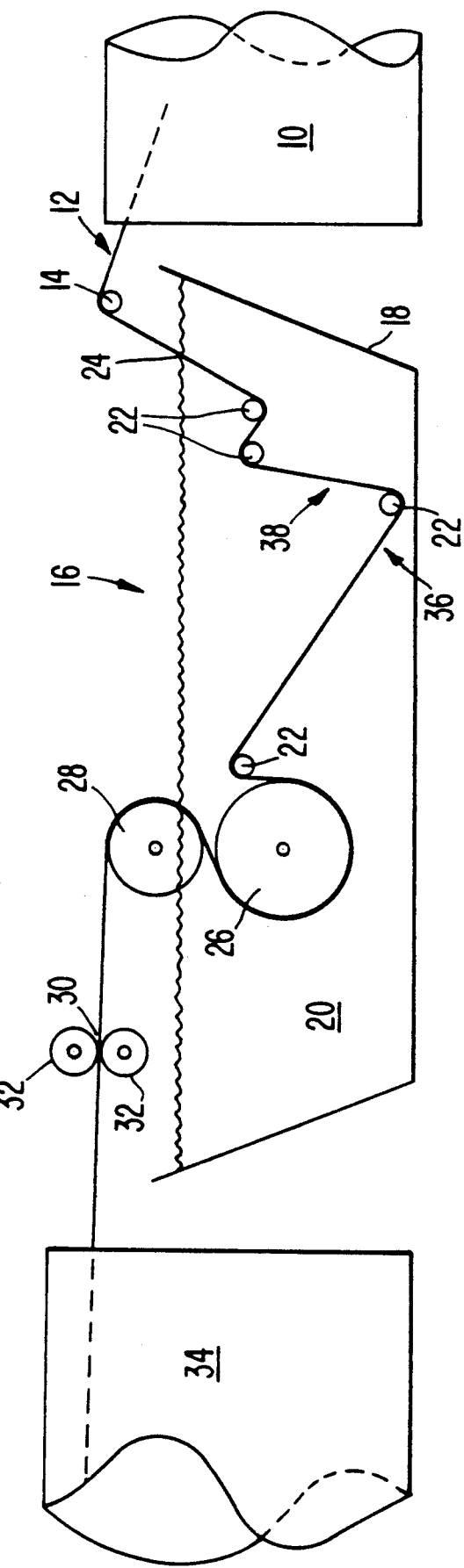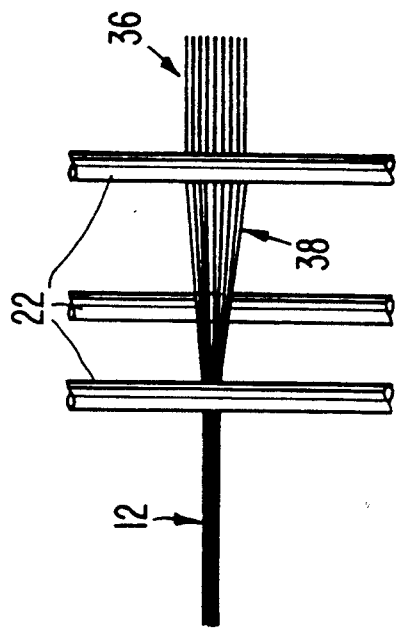

FIBER IMPREGNATION PROCESS

TECHNICAL FIELD

The present invention relates generally to packing materials for pumps and the like and specifically to a process for producing a yarn fiber for use in forming packing materials that is resistant to highly caustic chemicals and to the fiber produced according to this process.

BACKGROUND ART

For a pump to function properly, pump packing materials must form a dynamic seal and, in addition, must be resistant to the effects of temperature, pressure, dynamic or system induced abrasive wear and chemical attack. Pumps used in industries such as the pulp and paper industry require packing materials that are particularly able to withstand the highly alkaline environments in which they are required to function. Unless the pump packing material is resistant to these highly caustic conditions, in which the pH often approaches or exceeds 14, the pump will be unable to perform and maintain its sealing function. If the pump packing material is degraded by these combined chemical and physical influences and thus loses its integrity, an acceptable seal will not be formed and the pump will not be able to function properly.

Pump packing materials designed to operate under the aforementioned conditions have been formed from asbestos fibers and yarns that had been impregnated or coated with a variety of tetrafluoroethylene (hereinafter TFE) coating and dispersion systems. The combination of asbestos and TFE produced a pump packing material that was highly resistant to both chemicals and adverse pump influences. These pump packing materials, moreover, were economical because of the low cost of the asbestos yarn used to make them. Because of their low cost and effectiveness, asbestos and TFE pump packing materials were commonly selected for use in pump applications in the pulp and paper industries and elsewhere where they would encounter high concentrations of caustics.

In recent years as possible health problems have been raised in connection with asbestos, packing manufacturers and users experimented with many alternative constructions in an effort to replace or eliminate asbestos fibers from packings. Other fibers, such as cotton, flax, hemp, rayon, acrylic, fiberglass, KEVLAR and the like, were employed in conjunction with various coatings and dispersions to form yarns that could replace the asbestos in pump packings. Some of these fibers proved equal to or better than asbestos in certain applications. However, even these asbestos substitutes were of limited utility in highly caustic environments such as those routinely encountered by pumps employed in the pulp and paper industry.

Because these fibers are not inherently caustic resistant, resistance to caustic attack is imparted to such fibers and to yarns formed from them by coating the fibers and/or yarn with a heavy TFE dispersion. Because of the superior resistance of TFE to caustic attack, non-asbestos fibers and yarns coated with TFE can withstand caustic induced degradation up to a pH of about 10 to 12. TFE itself has a virtually perfect resistance to caustic attack, and as long as the TFE coating remains in place on the fibrous material forming the pump packing so that the yarn is completely covered, the packing material will be able to function at the high pH ranges encountered in pulp and paper processing and in similarly caustic applications. Complete protection against caustic attack, however, is not provided by currently available methods of producing TFE fibers and yarns.

The fibers used to make pump packings are initially formed into yarns, which are then braided, woven or knitted to produce the packing material. Coatings may be applied either to the yarn prior to braiding or to the finished braid or to both. While TFE dispersions are capable of seeping into and coating the yarn and fiber bundles, even the best coating technology cannot assure a completely uniform, perfect coating. For example, TFE particles may be prevented from reaching the yarn where trapped air pockets or bubbles are formed so that no coating at all is applied in these areas. In other areas the coating may be very thin. When the pump packing is exposed to high caustic concentrations, uncoated or thinly coated areas of fiber become foci for chemical attack. Once the actual fiber is exposed to caustic chemicals, these chemicals will travel axially along the fiber because of the natural wicking action of the fiber so that the fiber will be subject to caustic degradation along its axial length. The result is a rapid loss of basic yarn integrity and a collapse of the sealing performance properties of the packing.

Further, the very nature of the function of pump packing material results in the material being subjected to wear and degradation. When a pump is in operation, the interface between the packing and the rotating or reciprocating pump shaft is continuously subjected to abrasion and higher temperatures than the rest of the packing. Consequently, this temperature and system-induced abrasive wear will eventually degrade even a thick TFE coating. Ultimately, the protective TFE coating will be removed, exposing the underlying fiber body. Once exposed, the fiber will then be rapidly destroyed by caustic attack with a concomitant loss of yarn integrity and collapse of the sealing properties of the packing. Because the packing material will always be subjected to wear while the pump is in operation, once the protective TFE coating is removed from a part of the packing body, the worn area may spread rapidly through the packing body. The result is that a greater percentage of the total material is exposed to caustic attack as the pump continues to operate.

The only inherently caustic resistant, "moderately" priced, non-asbestos fibers in existence that are suitable for use as dynamic pump packings are TFE filaments. TFE filaments may be combined with carbons and graphites, or these materials may be used singly to form a yarn that is naturally resistant to caustic chemical attack and degradation. They comprise the only solution presently available to the industry for producing pump packings for high caustic concentration, dynamic pump services. Although yarns made from the aforementioned materials provide excellent serviceability, it comes at a cost. The basic TFE yarns as provided by the yarn manufacturers prior to production of the finished packing are more costly than the old asbestos/TFE finished products were. The carbon and/or graphite packings also carry a premium price. The costs of manufacturing TFE, carbon or graphite yarns are higher than the costs of manufacturing other yarn types. Therefore, when the asbestos pump packing materials formerly used for caustic applications were replaced with a functionally equivalent TFE, carbon and/or graphite packing, it was at a substantial price disadvantage.

Moreover, additional problems and expense result from the need, given the available pump packing materials, to carry extensive inventories of different pump packings capable of functioning over only relatively limited pH ranges. For example, the relatively low cost general service pump packing materials are not useful at high pH ranges for the reasons discussed above. This necessitates stocking, in addition, expensive pump packing materials for high pH applications. A typical paper mill uses hundreds of caustic service pumps as well as large numbers of other pumps in its manufacturing operations. Consequently, the mill must presently maintain, generally at substantial added cost, a dual inventory of suitable pump packing materials and must employ and train maintenance personnel to handle and service properly this dual inventory.

The packing material disclosed in U.S. Pat. No. 4,559,862 to Case et al represents an attempt to solve the aforementioned problems of providing a low cost substitute for asbestos fiber pump packing materials that is inherently caustic resistant. The packing material described in this patent is formed from a yarn made of a combination of both inorganic fibers, such as glass, and organic fibers, such as sintered polytetrafluoroethylene or polypropylene, rayon and the like, and may include a polytetrafluoroethylene binder or coating. While a yarn having such a composition presents some advantages, it also suffers from obvious disadvantages. If polytetrafluoroethylene is used as a coating or binder, the problems resulting from incomplete or uneven coating coverage discussed above are not overcome. If polytetrafluoroethylene is used in the form of fibers, the cost of the yarn becomes high. Consequently, the combination of inorganic glass-type fibers and organic fibers coated with polytetrafluoroethylene described in this patent does not provide the resistance to degradation at high caustic concentrations required by many pump applications.

The prior art, therefore, has failed to disclose a pump or valve packing material for use at high caustic concentrations that is characterized by both low cost and a long useful service life. The prior art has further failed to provide a method whereby low cost non-asbestos fibers may be rendered caustic resistant and then used to form such a caustic resistant pump packing material.

SUMMARY OF THE INVENTION

It is a primary object of the present invention to overcome the disadvantages of the prior art as described above and to provide a packing material that is both low in cost and able to provide a long service life in highly caustic environments.

It is another object of the present invention to provide a process for producing a low cost, highly caustic resistant non-asbestos fibrous material for use as a packing material for fluid sealing systems subjected to caustic environments.

It is yet another object of the present invention to provide a process for producing a low cost, highly caustic resistant packing material wherein non-asbestos fibers are rendered resistant to caustics.

It is still another object of the present invention to provide a process for producing a caustic resistant fibrous material wherein the fibrous material is rendered resistant to caustics by the complete impregnation and coating of low cost fibers that are not inherently caustic resistant with a substance that is inherently caustic resistant.

It is a still further object of the present invention to provide an economical packing material capable of withstanding caustic concentrations approaching or exceeding a pH of 14 while in dynamic pump service.

It is yet a further object of the present invention to provide an economical fibrous pump packing material that performs equally well in general and highly caustic pump applications, thereby allowing consumers to avoid the expense and problems of carrying dual pump packing inventories.

The aforesaid objects are satisfied by providing a process for producing a caustic resistant packing material that places a strand of yarn under tension and subjects the yarn to a spreading means for changing the cross-section of the yarn from a tightly bundled, compressed round cross-sectional configuration to a flattened, linear fiber array in which the fibers are substantially parallel and the surface of each individual fiber is completely exposed. Simultaneously, the yarn enters a highly alkaline coating solution ("solution" denotes a colloidal solution) that causes the individual fiber bodies to swell. The inside of the fiber is opened up enough to allow an inherently caustic resistant impregnating and coating solution to wick or migrate into the interior of the fiber body. The yarn is then drawn around coating rollers while the yarn continues to be stressed to spread and open the fibers, thereby insuring that the solution will completely impregnate and coat all the fibers in the yarn. The wet impregnated, coated fibers are passed through a nip where excess solution is squeezed from the fibers, further flattening the linear fiber array. The yarn, still in this flat, ribbon-like configuration and under tension, is passed through an oven where the fiber bodies are condensed back to their original form, thus trapping the impregnating and coating solution inside the fiber body itself. Drying is continued until the yarn is substantially free of water. The resultant dried and coated yarn is wound on conventional winders and is thus available for braiding. The yarn produced by the aforementioned process includes fibers that are not only completely coated on the exterior surfaces with the inherently caustic resistant impregnating and coating solution, but are completely impregnated throughout the interiors with the inherently caustic resistant impregnating solution, thereby rendering the yarn itself caustic resistant.

Other objects and advantages will be apparent from the following description, claims and drawings.

BRIEF DESCRIPTION OF THE DRAWINGS

FIG. 1 is a side diagrammatic view of the process of the present invention and apparatus suitable for carrying out this process; and FIG. 2 is a top diagrammatic representation of the yarn spreading step of the present process.

DESCRIPTION OF THE PREFERRED EMBODIMENTS

The packing industry has long sought an economical non-asbestos, braided general service packing that also has sufficient caustic chemical resistance to enable it to have a long useful service length at the high pH ranges characteristic of concentrated caustics. The present invention provides not only such a product, but also a method whereby this product may be produced. In its most basic form the invention involves thoroughly impregnating and coating a relatively low cost, noninherently caustic resistant fiber with a known caustic-resistant material to make the fiber virtually completely caustic resistant. As a result, this type of fiber can be used to form a packing material that can be used in general service applications as well as in highly caustic environments, thereby saving packing users the cost and problems associated with carrying an inventory of environment-specific packings. Because the basic yarn fiber forming the packing is significantly lower in cost than available non-asbestos caustic resistant materials, the product of the present invention carries a substantial price advantage to the packing consumer. Moreover, this economy is achieved without sacrificing the performance of the packing material.

The process of the present invention is described primarily with reference to the production of a pump packing material. However, this process may be used to form a packing material for use in any fluid sealing system, including pumps, valves, expansion joints, hydraulic cylinders and the like.

The process of the present invention involves placing a yarn under tension and subjecting the yarn to a spreading operation, which gradually separates the individual fibers making up the yarn so that they are spaced apart and substantially parallel in a flat fiber array and simultaneously running the yarn through a TFE dispersion bath having a highly alkaline pH to open up the individual fibers and allow the TFE dispersion to penetrate into the interior of the fibers. The fiber array is then passed around a pair of coating rolls to insure that the exterior of the fibers is completely coated with the dispersion, is directed through a nip to remove excess liquid and, finally, is passed through a drying oven where the fibers are condensed back to their original form, trapping the TFE inside the fiber body. After drying, the TFE impregnated and coated yarn may be formed into braids, knitted or the like to produce pump or valve packings.

Referring now to the drawings, FIG. 1 illustrates a side schematic view of the present process. A multiposition yarn package creel 10 serves as a storage device for yarn which is fed from yarn storage packages (not shown) to provide feed yarn for the present process. It is contemplated that this process will be continuous; however, a noncontinuous process is also contemplated to be within the scope of the present invention. The yarn 12 is fed from the creel 10 over the creel let off roller 14 to a coating tank assembly 16. The yarn is placed under tension after it leaves the creel 10 and is maintained under tension throughout the process. The coating tank assembly 16 includes a tank 18 which holds a fiber coating and impregnating solution 20 containing a caustic resistant material. Several spreader bars 22 which are shown and described in more detail in FIG. 2, convert the single yarn strand into a flat array of separate fibers as shown at 36 in FIG. 2. Preferably the yarn has zero twist.

Four spreader bars 22 are shown in FIG. 1; however, other numbers of these bars may also be employed to separate the yarn into individual fiber strands while it is maintained under tension. The spreader bars 22 change the cross-sectional configuration of the yarn 12 from a tightly bundled and compressed round shape to a flat, ribbon-like configuration. The yarn fibers are drawn over and around the spreader bars 22 at sharp angles under tension. The spreader bars may be deployed in a rotary and/or stationary mode to achieve this function. After the yarn 12 has traveled around all of the spreader bars as shown in FIG. 1, the single yarn bundle will have become the spaced fiber array 36 shown in FIG. 2. During the fiber spreading portion of the process, the yarn enters the coating and impregnating solution 20 at entry point 24 so that the fibers are simultaneously spread and exposed to the solution. This solution is highly alkaline, as will be described in more detail hereinbelow, and, therefore, causes the individual fiber bodies to balloon or swell. This swelling allows the inside of the fiber to be opened up enough so that the coating and impregnating solution and, therefore, the caustic resistant material can enter the interior of the fiber body by migration or wicking. The yarn 12 is immersed in this highly alkaline solution 20 throughout the majority of its path through the coating tank assembly 16.

The yarn 12, in the form of a flat spaced fiber array 36 wherein the fibers are substantially parallel to each other is directed from the last spreader bar 22 around a main coating roller 26 and from there around an auxiliary coating roller 28. Rollers 26 and 28 may be any type of conventional coating and auxiliary coating roller, although it is preferred that the diameter of roller 26 be larger than that of roller 28. This step further insures that the fibers will also be thoroughly coated with the highly alkaline solution 20.

The fiber array 36 is then directed through a nip 30 formed by a pair of squeeze rollers 32, where any excess solution 20 is squeezed from the fibers. The fiber array 36, which is quite flat and ribbon-like after passing through nip 30 is directed into a drying oven 34. The fiber array continues to be maintained under tension as it is directed into the oven. In the oven 34, the tension is released and the fibers are condensed from a spread-out, array of parallel fibers back to their original, unballooned form, which results in the coating and impregnating solution containing the caustic resistant material being trapped inside the fiber body. The drying step is continued until the fiber is substantially dry. The resulting dried impregnated and coated yarn is taken up by conventional winders (not shown) in package form, preferably ready for braiding.

From the time yarn 12 enters solution 20 until it is processed through the drying oven 34, the yarn 12 is held under tension and stressed to mechanically spread open the yarn fibers to permit the coating and impregnating solution containing the caustic resistant material to penetrate each of the fiber bodies and thus impregnate each fiber as thoroughly as possible. The solution also contains ammonium hydroxide, which not only makes it highly alkaline, but also causes the individual fibers to "balloon" out and open up or become porous, further facilitating the penetration of the caustic resistant material into the fibers.

FIG. 2 illustrates diagrammatically the action of spreader bars 22 on yarn 12 to produce an array 36 of spaced, substantially parallel fibers. As previously mentioned, the spreader bars 22 may be either rotary or stationary. With each pass over one of the spreader bars 22, the fibers forming the yarn 12 gradually spread from a round bundle to a ribbon cross-section, as at 38, and finally, into a fiber array such as 36 in which the individual fibers of the original yarn bundle are completely separated and are spaced axially along the spreader bar 22 so that the fibers are substantially parallel to each other. As the yarn 12 travels downstream over each of the spreader bars 22, the gradual spreading and separation of the fibers insures that the entire exterior surface of each fiber will be exposed to the solution 20. The yarn remains in the form of a linear fiber array 36 as it travels around the main coating roller 26, the auxiliary coating roller 28, through squeeze rolls 32 and into the drying oven 34. During oven processing, the tension on the yarn is released, thereby allowing the fiber bodies to be condensed back to their original form.

The yarn preferred for use in the present invention is formed from rayon fibers. It is contemplated that other similar low cost non-asbestos celluosic based fibers could also be employed in this process.

The coating and impregnating solution 20 is preferably formed from a highly alkaline suspension of pure colloidal TFE and a surfactant. The solution is made highly alkaline by the addition of ammonium hydroxide ($NH_4OH$). A ratio of 1:10.8 $NH_4OH$ to TFE, which creates a pH of about 10, is preferred to achieve a complete impregnation of each fiber body in the fiber array. Higher or somewhat lower $NH_4OH$ levels may be used. The level of $NH_4OH$ causes the fiber body to swell and open up or "balloon" or become porous so that the TFE solution penetrates the inside of the fiber where it is locked after the drying step. A surfactant is a necessary ingredient in the formation of TFE dispersions and functions to improve the wettability of the TFE. A surfactant preferred for use in making the TFE dispersions described herein is Triton X-100, available from Rohm and Haas Co. Other functionally equivalent surfactants could also be employed.

Graphite, which functions as a solid film lubricant, may also be added, as may any one of a number of other solid film lubricants. Graphite, however, was discovered to function also as a visual aid, confirming the complete penetration of the fiber body interior by the TFE solution. The normal color of both TFE dispersions and rayon is off-white. Graphite is black. Prior to the discovery that a highly alkaline TFE solution is required to insure complete fiber penetration by the TFE, yarn coated with a TFE/graphite dispersion and then cut showed white specks where the individual fibers were cut, thus indicating that the TFE/graphite dispersion did not penetrate into the fibers. In contrast, when a highly alkaline TFE/graphite suspension prepared according to the present invention was used as the coating and impregnating solution, the yarn was entirely black when viewed in cross-section, indicating that all areas of the fibers' interiors were completely penetrated by the TFE/graphite suspension.

Although it is an excellent surface lubricant for use on fibers, graphite is included in the coating and impregnating solution primarily as a coloring agent. Other coloring agents such as carbon black, mica, tungsten disulfide, molybdenum disulfide and the like could also be used as coloring agents, singly or in combination.

The finished coated and impregnated yarn is approximately 40% fiber and 60% impregnant and coating. When the coating and impregnating solution contains a solid film lubricant, the coating has approximately the following composition:
70% TFE
30% Fillers (93% solid film lubricant, 5% $NH_4OH$ crystals and 2% surfactant)
When the solid film lubricant is omitted, the coating is then 93 to 96% TFE.

EXAMPLE

The preparation of a coating and impregnating solution which was successfully employed to render rayon fibers resistant to high caustic concentrations was achieved as follows:

Two 30 gallon drum-type containers were used to mix the following solutions:

| Drum No. 1 | |
|---|---|
| 83 lb 12 oz | Tap Water |
| 13 lb 8 oz | $NH_4OH$ |
| 12 oz | Triton X-100 |

The drum was first filled with tap water. The $NH_4OH$ was added carefully with stirring, and the Triton X-100 was then added and the resulting solution stirred well.

| Drum No. 2 | |
|---|---|
| 35 lb 5 oz | Molybdenumdisulfide |

Fifty percent of the Drum No. 1 solution was added to the Molybdenumdisulfide, and the resulting mixture was stirred well.

To a third, 55 gallon drum (Drum No. 3) was added 145 lb. 8 oz polytetrafluoroethylene in the form of TFE Suspensoid TD-30, available from the DuPont Company The solution from Drum No. 2 was stirred into Drum No. 3 and mixed with the TFE Suspensoid. The remaining of Drum No. 1 were poured first into Drum No. 2 to rinse it and were then added to Drum No. 3.

35 lb. 5 oz. Dixon Air Spun Graphite was stirred into Drum No. 3.

After a thorough mixing, the coating and impregnating solution in Drum No. 3 was ready to use. The pH of the solution produced as described was about 10.

Caustic dynamic pump testing trials at a pH in excess of 14 have confirmed that pump packing braids made from rayon fibers impregnated with and coated with a TFE solution made according to the above Example in accordance with the process described herein performs better than and is nearly as resistant to highly caustic chemicals as the substantially more costly state-of-the-art pure TFE pump packings and TFE/graphite pump packings.

INDUSTRIAL APPLICABILITY

Coated and impregnated fibers formed according to the process of the present invention will find application in the formation of packing materials for use in highly caustic environments, such as those routinely encountered in the pulp and paper industry. The present process can be used to form packing materials for any other fluid sealing system likely to be used in caustic environments as well, such as valves, expansion joints, hydraulic cylinders and the like. The present process could also be used to form a yarn-based material for use in any caustic environment. The process of the present invention could further be employed to impregnate fibers with substances that require ammonium hydroxide to maintain an alkaline pH to keep these substances in suspension. The preferred rayon fiber/TFE coating and impregnant of the present invention is particularly useful for forming an economical packing that is able to function effectively over a wide range of environmental conditions, thus eliminating the need to stock environment-specific packings.

I claim:

1. A process for producing a fibrous non-asbestos packing material capable of withstanding high concentrations of caustic chemicals including the steps of
   a. providing a supply of noncaustic resistant yarn in the form of a single continuous strand, said strand being formed of a plurality of fiber bodies;
   b. placing said yarn strand under tension;
   c. subjecting said tensioned yarn strand to a plurality of spaced spreader means, thereby gradually changing the configuration of said yarn strand from a substantially round bundle to a substantially flat linear array of spaced fiber bodies;
   d. simultaneously with step c directing said tensioned and spread yarn fiber bodies through a highly alkaline colloidal solution of an inherently caustic resistant material so that each said fiber body is completely contacted and wet by said solution;
   e. subjecting said tensioned wet fiber array to pressure and heat to remove the excess solution and dry said fiber array; and
   f. relaxing the tension on said fiber array and condensing said fiber array to the configuration of said yarn strand of step a.

2. The process described in claim 1, wherein said highly caustic resistant material comprises tetrafluoroethylene.

3. The process described in claim 2, wherein said yarn comprises rayon.

4. The process described in claim 3, wherein said solution contains ammonium hydroxide and the pH of said solution is about 10.

5. The process described in claim 4, wherein the ratio of ammonium hYdroxide to tetrafluoroethylene in said solution is about 1:10.8.

6. The process described in claim 5, wherein said solution contains a surfactant.

7. The process described in claim 6, wherein said solution contains a coloring agent.

8. The process described in claim 7, wherein said coloring agent is selected from the group consisting of graphite, carbon, mica, tungsten disulfide and molybdenum disulfide.

9. The process described in claim 8, further including the step of forming a plurality of said yarns into a braid.

10. A process for producing a fibrous non-asbestos packing material capable of withstanding high concentrations of caustic chemicals including the steps of:
    a. providing a supply of rayon yarn in the form of a single continuous strand, said strand being formed of a plurality of fiber bodies;
    b. placing said yarn strand under tension;
    c. subjecting said tensioned yarn strand to a plurality of spaced spreader means, thereby gradually changing the configuration of said yarn strand from a substantially round bundle to a substantially flat linear array of spaced fiber bodies;
    d. simultaneously with step c directing said tensioned and spread fiber bodies through a colloidal solution containing ammonium hydroxide and a surfactant and having dispersed therein tetrafluoroethylene and graphite, the ratio of ammonium hydroxide to tetrafluoroethylene being about 1:10.8, so that each said fiber body is completely contacted and wet by said solution;
    e. subjecting said tensioned wet fiber array to pressure and heat to remove the excess solution and dry said fiber array; and
    f. relaxing the tension on said fiber array and condensing said fiber array to the configuration of said yarn strand of step a.

11. A process for producing a fibrous packing material characterized by low cost and resistance to high concentrations of caustics comprising expanding individual inherently non-caustic resistant fibers by contacting each fiber with a highly alkaline colloidal solution and simultaneously completely impregnating the interior of and completely coating the exterior of said fibers with a known inherently caustic resistant material to render the fibers caustic resistant, drying said fibers and combining a plurality of said caustic resistant fibers to form said packing material.

12. The process described in claim 11, wherein said fibers comprise rayon.

13. The process described in claim 12, wherein said caustic resistant material comprises tetrafluoroethylene.

14. The process described in claim 13, wherein a plurality of said caustic resistant fibers are formed into a braid to produce said packing material.

* * * * *